(12) United States Patent
Lambert

(10) Patent No.: US 9,544,376 B1
(45) Date of Patent: Jan. 10, 2017

(54) METHOD AND APPARATUS FOR SECURELY DISCOVERING SERVICES IN A WIRELESS NETWORK

(71) Applicant: MARVELL INTERNATIONAL LTD., Hamilton (BM)

(72) Inventor: Paul A. Lambert, Mountain View, CA (US)

(73) Assignee: MARVELL INTERNATIONAL LTD (BM)

( * ) Notice: Subject to any disclaimer, the term of this patent is extended or adjusted under 35 U.S.C. 154(b) by 52 days.

(21) Appl. No.: 14/324,521

(22) Filed: Jul. 7, 2014

Related U.S. Application Data

(60) Provisional application No. 61/845,330, filed on Jul. 11, 2013.

(51) Int. Cl.
*H04L 29/08* (2006.01)
*H04L 29/06* (2006.01)
*H04W 12/08* (2009.01)
*H04W 48/16* (2009.01)

(52) U.S. Cl.
CPC ............. *H04L 67/16* (2013.01); *H04L 63/061* (2013.01); *H04W 12/08* (2013.01); *H04W 48/16* (2013.01)

(58) Field of Classification Search
CPC ......... H04L 63/061; H04L 67/16; H04W 8/16; H04W 12/08

USPC ............................................................. 726/3
See application file for complete search history.

(56) References Cited

U.S. PATENT DOCUMENTS

| | | | |
|---|---|---|---|
| 2004/0240669 A1* | 12/2004 | Kempf | H04L 29/12009 380/277 |
| 2007/0079362 A1* | 4/2007 | Lortz | H04L 63/0807 726/5 |
| 2009/0119407 A1* | 5/2009 | Krishnan | H04L 63/0281 709/228 |
| 2011/0055545 A1* | 3/2011 | Sovio | G06N 5/02 713/150 |
| 2012/0272064 A1* | 10/2012 | Sundaram | H04L 9/0894 713/171 |
| 2014/0254566 A1* | 9/2014 | Qi | H04W 56/00 370/336 |
| 2015/0172391 A1* | 6/2015 | Kasslin | H04L 67/16 370/338 |

* cited by examiner

*Primary Examiner* — Jung Kim
*Assistant Examiner* — Thomas Ho

(57) ABSTRACT

Systems, methods, and other embodiments associated with secure service discovery in a neighbor awareness network are described. According to one embodiment, a device includes service logic configured to generate a discovery communication that is associated with a service provided in a neighbor awareness network (NAN). The NAN includes a plurality of remote devices. Encoding logic configured to generate a secure identifier from a unique identifier of the service by, (i) encoding the unique identifier, and (ii) truncating the encoded unique identifier to form the secure identifier. The secure identifier is inserted in the discovery communication.

17 Claims, 4 Drawing Sheets

METHOD AND APPARATUS FOR SECURELY DISCOVERING SERVICES IN A WIRELESS NETWORK

CROSS REFERENCE TO RELATED APPLICATIONS

This patent disclosure claims the benefit of U.S. Provisional Application Ser. No. 61/845,330 filed on Jul. 11, 2013, which is hereby wholly incorporated by reference.

BACKGROUND

As wireless devices become more pervasive and technologically capable, services shared between the wireless devices also become more pervasive. For example, the services may include functionality that is provided between devices in an ad-hoc manner or functionality that relates to interacting with other devices within a close proximity when a wireless device is moving between locations. A wireless device that moves between locations will not initially be aware of other devices in different locations and not aware of services provided by the other devices. Discovery communications are a type of wireless communication that the wireless device may use to discover devices and services provided by the devices.

A discovery communication is an open communication that is not encrypted or otherwise secured in order to permit other devices to easily determine availability of services from the discovery communication. However, because the communications are open they are vulnerable to eavesdropping and attacks by malicious users. Accordingly, sharing services between wireless devices presents security difficulties.

SUMMARY

In general, in one aspect this specification discloses an apparatus. The apparatus includes encoding logic configured to generate an obscured identifier from a unique identifier of a service by, (i) encoding the unique identifier, and (ii) truncating the encoded unique identifier to form the obscured identifier. The apparatus includes service logic configured to control a wireless transmitter to wirelessly transmit the obscured identifier in a communication to a plurality of remote devices. The service is provided over a wireless connection in a network. The network includes the plurality of remote devices.

In general, in another aspect, this specification discloses a method. The method includes generating an obscured identifier from a unique identifier assigned to a service by (i) encoding the unique identifier, and (ii) truncating the encoded unique identifier to form the obscured identifier. The method includes wirelessly transmitting the obscured identifier in a communication to a plurality of remote devices. The service is provided over a wireless connection in a network.

In general, in another aspect, this specification discloses a device. According to one embodiment, a device includes service logic configured to generate a discovery communication that is associated with a service provided in a neighbor awareness network (NAN). The NAN includes a plurality of remote devices. The device includes encoding logic configured to generate a secure identifier from a unique identifier of the service by, (i) encoding the unique identifier, and (ii) truncating the encoded unique identifier to form the secure identifier. The secure identifier is inserted in the discovery communication.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa.

DETAILED DESCRIPTION

Described herein are examples of systems, methods, and other embodiments associated with obscuring service identifiers in discovery communications to secure the service identifiers from being recognized by malicious devices in a wireless network or other network. Service discovery refers to how devices announce availability of a service and also how devices discover services available from other devices in a network. In one embodiment, a system is disclosed that obscures service identifiers in discovery communications to provide security from malicious attacks. For example, a service identifier may be encoded and then truncated to create an obscured identifier. The devices use the obscured identifier in the discovery communications to secure service discovery between authorized devices and prevent unauthorized devices from obtaining information about services.

Figure 1:
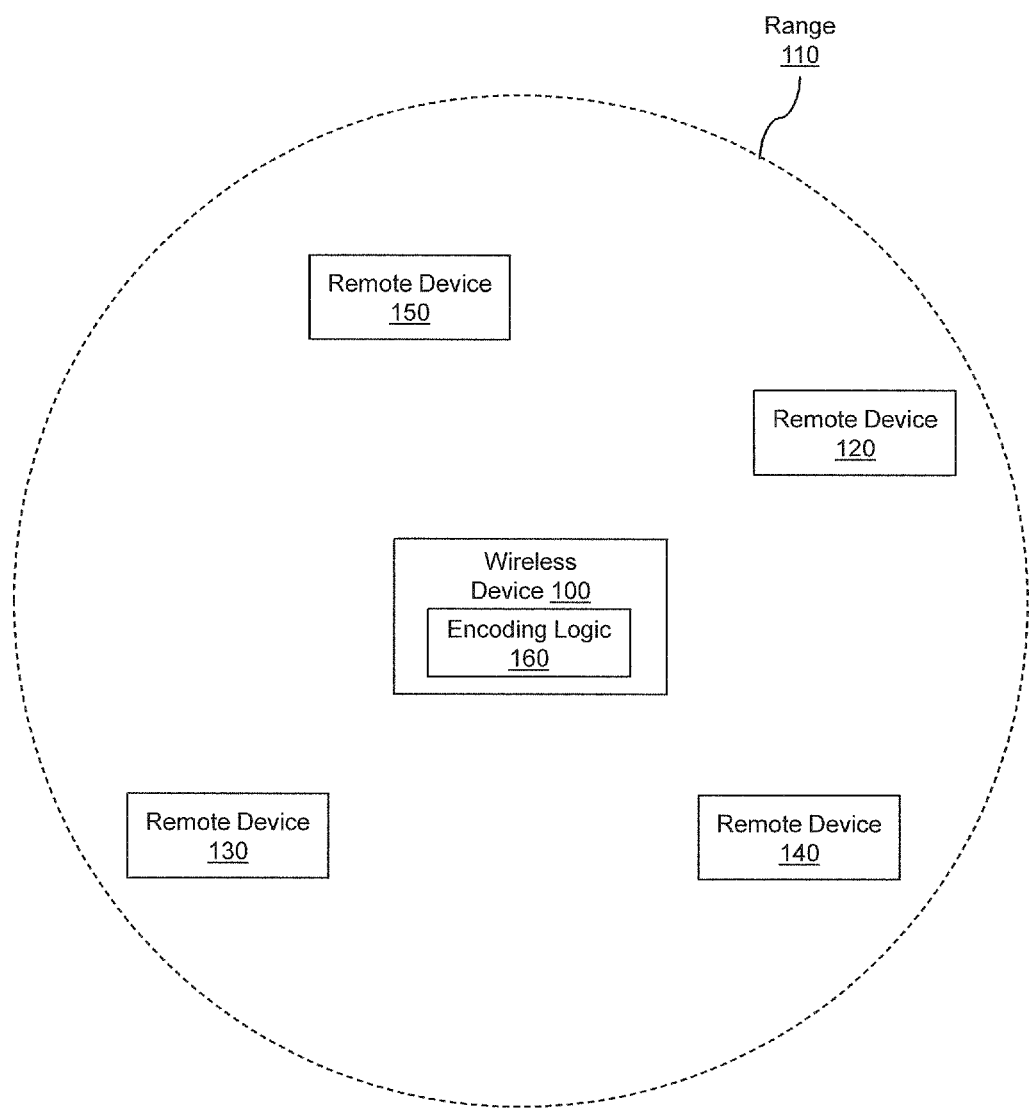
FIG. 1 illustrates one embodiment of a wireless device associated with securing service discovery in a wireless environment.

With reference to FIG. 1, one embodiment of a wireless device 100 is illustrated that is configured to provide secure service discovery between other devices in a wireless environment. Suppose that the wireless device 100 migrates between various locations. The wireless device 100 may be a smart phone, laptop, or other mobile device that can communicate using a wired connection or wirelessly with the different devices. When in a location, such as the wireless environment illustrated in FIG. 1, the wireless device 100 may wirelessly interact with other wireless devices that are within a transmission range 110 of the wireless device 100. For example, remote devices 120, 130, 140 and 150 (hereinafter collectively referred to as remote devices 120-150) represent example devices that may communicate with the wireless device 100. The remote devices 120-150 may be mobile devices, smart phones, laptops, printers or any other device that can communicate wirelessly. While the wireless device 100 and a wireless environment are discussed, in other embodiments, devices may be wired (e.g., Ethernet) and communications may be carried on wired connections.

In one embodiment, the wireless device 100 may form a network with devices (e.g., remote devices 120-150) within the transmission range 110. The network is, for example, a broadcast media, a neighbor awareness network (NAN), an IEEE IEEE 802.11aq network, a peer-to-peer network, an ad-hoc network, an independent basic service set (IBSS), a mesh network and so on. In general, the network is any network that can support wired and/or wireless communications between devices that involve sharing services.

Furthermore, the wireless device 100 and the remote devices 120-150 may share services as part of participating in the network. In general, the term "services" refers to functionality that is provided between devices. The devices may be a part of a same network or may be remote devices. Accordingly, services may be provided through Internet based servers to the wireless device 100 or between devices on the network. For example, wireless device 100 and the remote devices 120-150 exchange discovery communications to announce and setup the sharing of the services. In one embodiment, wireless device 100 includes encoding logic 160 configured to secure the discovery communications to protect the wireless device 100 and the remote devices 120-150 from malicious attack. For example, prior to the wireless device 100 (or one of the remote devices 120-150) transmitting a discovery communication, an identifier of a service that is included within the discovery communication is obscured to protect the identifier from being recognized by any unauthorized device (e.g., a malicious device). Of course, one or more of the remote devices 120-150 would also be configured with similar encoding logic 160 so that the obscured service identifiers are recognizable between each other.

Figure 2:
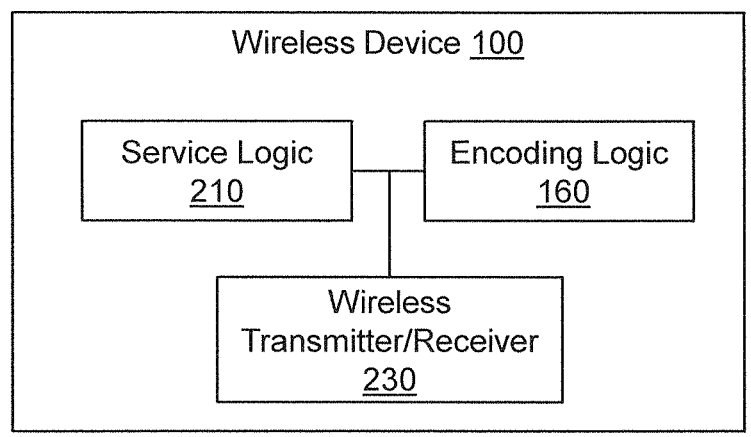
FIG. 2 illustrates one embodiment of a wireless device associated with securing service discovery.

FIG. 2 illustrates additional aspects of the wireless device 100 and will be discussed along with elements of FIG. 1. In FIG. 2, the wireless device 100 includes at least service logic 210, encoding logic 160, and a wireless transmitter/receiver 230. Other components may include a processor, memory, display, interfaces, and/or other components of a computing device. In general, the service logic 210 generates discovery communications in accordance with a selected protocol. The service logic 210 also controls the wireless transmitter 230 to transmit the discovery communications. The encoding logic 160 is configured to encode service identifiers and otherwise obscure sensitive information in the discovery communications prior to the discovery communications being transmitted.

As previously stated, discovery communications are messages that announce/publish the availability of a service, query for availability of a service, or subscribe to a service that is available. A discovery communication may be either unicast or broadcast depending a particular implementation. In general, a request or other triggering event that is issued by an application/service or other entity causes the service logic 210 to generate a discovery communication. The request may be an internal request of the wireless device 100 that is generated by a service, user input, a query received from another device or some other mechanism. In either case, the request induces the service logic 210 to generate a discovery communication that provides information about a service in response to the request.

The service logic 210 is configured to generate/build the discovery communication with information that describes the service and/or parameters about how the service is configured. For example, to identify the service in the discovery communication, the service logic 210 is configured to determine a unique identifier of the service. In one embodiment, the unique identifier is assigned according to a naming standard that may predefined by the protocol of the service discovery. Thus each unique service has a predefined unique identifier that is assigned to the service. In general, the naming standard is a functionality shared by devices in the network that permits the devices to communicate about services using a standardized naming scheme. In this way, unique identifiers of services are recognizable and identifiable by other devices that operate with the same service discovery protocol However, using known naming standards permits unauthorized devices to recognize the unique identifier if left unsecured.

In one embodiment, to determine the unique identifier that is assigned to a particular service, the service logic 210 uses a library of identifiers for a plurality of services. In another embodiment, the service logic 210 calculates the unique identifier or requests the unique identifier from a common source (e.g., web service). The naming standard may be a Universal plug and play (UPNP) standard, Miracast, DLNA, Bonjour and so on.

After determining the unique identifier, the service logic 210 provides the unique identifier of the service to the encoding logic 160. In one embodiment, the encoding logic 160 is configured to encode the unique identifier so that unauthorized devices will not recognize the unique identifier that identifies the service based on the known naming scheme. As previously explained, discovery communications are expected to be open so that all devices using the same protocol can recognize the communications. Here, the encoding logic 160 modifies the discovery communications so they are not recognized as expected. For example, the encoding logic 160 uses an encoding function or other encoding scheme to encode the unique identifier. The function may be a hash function or another cryptographic function. Additionally, the encoding logic 160 is configured to use a key or other shared secret along with the encoding function to ensure that the unique identifier is recoverable by other devices that have the key.

In one embodiment, the key is a cryptographic key that is shared by members of the network (i.e., remote devices 120-150). The members may acquire the group key by associating with the wireless device 100 or from another common source (e.g., a common service provider). In either case, devices that are members of the network share the key exclusive to devices that are not members. Accordingly, in one embodiment, the encoding logic 160 uses the key with a hash function to encode and secure the unique identifier from devices that do not possess the key. Once the unique identifier is encoded, it is secure from devices that do not possess the key since those devices will not be able to recognize the unique identifier in an encoded form. Thus, those devices will not be able to identify the service corresponding to the unique identifier.

To further obscure the unique identifier, in one embodiment, the encoding logic 160 is configured to truncate the encoded unique identifier. By truncating the encoded unique identifier, the encoding logic 160 further obscures the unique identifier from being recognized by a malicious attack. The encoding logic 160 may truncate the encoded unique identifier by selecting one of many different octets in the encoded unique identifier to use as the obscured identifier. For example, an encoded unique identifier may include 128, 256, 512 or another number of bits that are specific to a type of encoding. In one embodiment, the encoding logic 160 is configured to segment the encoded unique identifier into 8 bit segments that are referred to as "octets." The encoded unique identifier may be composed of 16 or more octets depending on a length of the encoded unique identifier as provided for by the encoding function.

Accordingly, the encoding logic 160 selects one of the octets from the encoded unique identifier to use in the discovery communication as the obscured identifier of the service. In this way, the discovery communication is secured against unauthorized devices becoming aware of which service the discovery communication indicates.

Additionally, in one embodiment, the encoding logic 160 is configured to encode other sensitive information in the discovery communication that may identify the service. For example, the encoding logic 160 may encode any information that could be used by an unauthorized device to ascertain information about an identity of the service. Thus, the encoding logic 160 may apply the encoding function to parameters in the discovery communication in addition to the unique identifier of the service. This added encoding helps to further obscure which service is indicated by the discovery communication without using, for example, an infrastructure based encryption, such as standard layer 2 encryption, to encrypt an entire payload of the discovery communication. As such, a portion of the service discovery communication is encoded and/or obscured while other portions are not.

Once an identity of the service is obscured, the service logic 210 controls the wireless transmitter 230 to wirelessly transmit the discovery communication. Because service discovery includes announcement communications, query communications and subscription communications, the obscured service identifier may be used with all of these different communications to secure the discovery communications against being recognized by unauthorized devices. Thus, the service logic 210 is configured to control the wireless transmitter 230 to broadcast, multicast or unicast the discovery communication depending on which type of communication is being transmitted.

Additionally, in one embodiment, the service logic 210 is configured to generate a reply discovery communication in response to receiving a query or other discovery communication. The wireless device 100 may obscure identifiers in a reply discovery communication in a similar fashion as described previously.

In one embodiment, instead of using an obscured identifier that is identical in a reply, the encoding logic 160 is configured to change between different obscured identifiers. The encoding logic 160 is configured to use a different octet from the encoded unique identifier than an octet used for a previous obscured identifier of the same service. The obscured identifier in the subsequent discovery communication is then not the same as the previous obscured identifier or, in other words, is asymmetric to the previous obscured identifier. In this way, an obscured identifier for a service can be changed between discovery communications to indicate the same service while securing the communications from being recognized by unauthorized devices.

Figure 3:
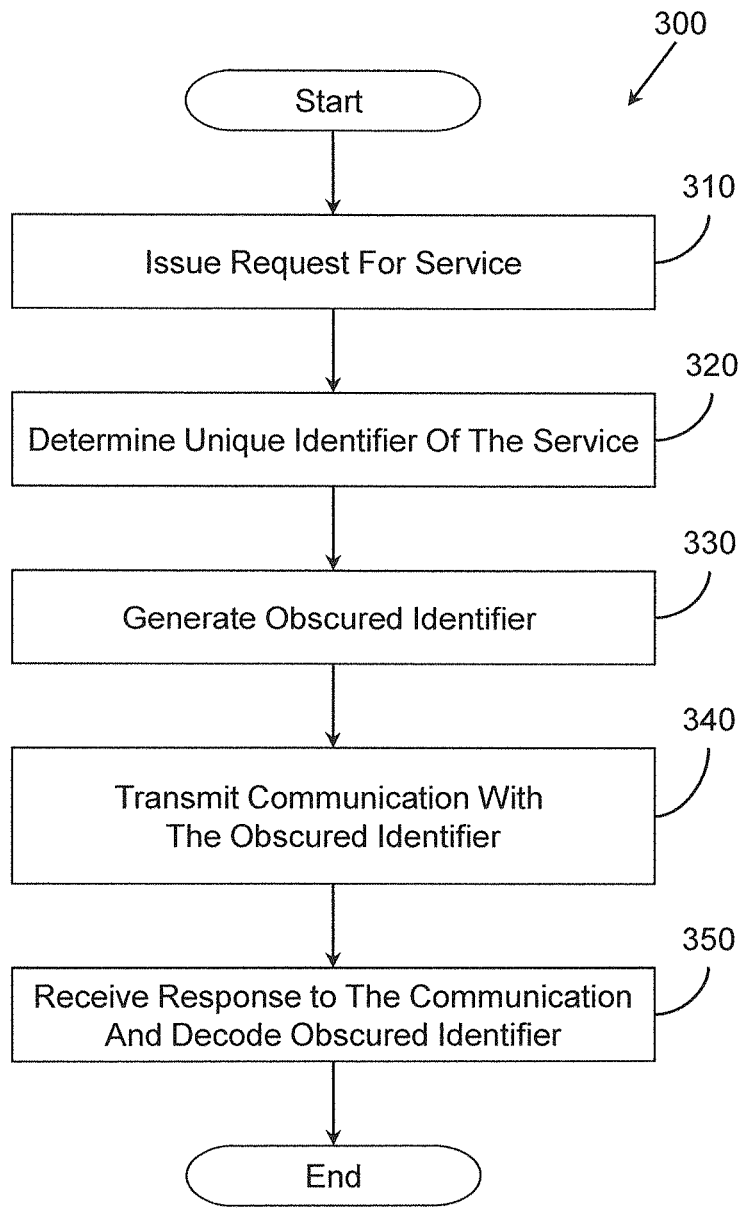
FIG. 3 illustrates one embodiment of a method associated with obscuring service identifiers for service discovery.

Further aspects of securing service discovery will be discussed with reference to FIG. 3 and method 300. FIG. 3 illustrates one embodiment of a method 300 associated with secure service discovery. Method 300 will be discussed from the perspective of a device that communicates with other devices using wireless communications as previously described. Of course, the present disclosure is not limited to wireless media but instead may include broadcast media in the form of both wired and wireless media. In one embodiment, the service logic 210 and encoding logic 160 are configured to perform the method 300.

Additionally, in one embodiment, the device and the other devices form a temporary network to share services. The temporary network may be a neighbor awareness network (NAN) or other network that is ad-hoc and does not use, for example, pre-established infrastructure (e.g., an access point). However, even though the network does not use pre-established infrastructure a key is generally shared between members of the network. The key may be shared using a secure exchange when the devices associate to form the temporary network, according to a common service provider or by another mechanism that provides for key sharing.

Furthermore, a service as used within this disclosure refers to a computing service and/or presence information about a device or set of devices. The computing service is functionality that is provided across a network connection according to, for example, an application on a separate device. In one example, the services include printing, media access, games, connections for sharing information, web services, network device access, and so on. The presence information may include parameters that describe local devices and, in one embodiment, services provided by the local devices. Thus, the devices may exchange many different types of information and functionality using the services. In general, the devices first discover the availability of services before information can be shared.

Method 300 begins, at 310, when a request is issued within the device for a service. In one embodiment, the request is a request to locate a provider of the service (i.e., query). However, the request may also be a request to announce availability of a service or subscribe to a service. In general, the "service" is a service that is provided between devices over a wired or wireless connection. Accordingly, the request initiates the device to begin generating a discovery communication for communicating with another device about sharing the service.

At 320, a unique identifier that correlates with the service is determined so that the service can be identified within the discovery communication by a recipient device. In one embodiment, the device determines the unique identifier according to a standard or protocol for naming services as previously described. In general, the identifier of the service is unique and ascertainable using the naming standard so that disparate devices can communicate about the service without pre-exchanging information regarding the service. For example, the unique identifier of the service may be determined according to a function, a look-up table, a service provided by a standards group and so on. The standard may be a media standard, a networking standard, a sharing standard and so on.

Once the unique identifier of the service has been determined, an obscured identifier is generated from the unique identifier at 330. The obscured service identifier is then inserted/added into the discovery communications in place of the expected unique identifier. Using the obscured identifier secures communications that provide information about the service from unwanted intrusion. The obscured identifier prevents other devices from recognizing the ascertainable unique identifier and thus the service that the identifier identifies cannot be recognized.

In one embodiment, generating the obscured identifier occurs in at least two parts. For example, the unique identifier is encoded and, subsequently, the encoded unique identifier is truncated to form the obscured identifier. Suppose that the service is a music service with a unique identifier that is the character string ("NetMusic"). Of course, while the unique identifier is represented by a string of only letters, in one embodiment, the unique identifier may include letters, numbers, special characters and so on. The unique identifier is first normalized as part of encoding. The unique identifier may be normalized to ensure a uniform outcome between different devices encoding the same unique identifier. For example, the unique identifier may be modified to ensure uniformity in capitalization. Thus, in this example, the unique identifier is modified to include lower case characters ("netmusic").

The normalized string of the unique identifier is then encoded by applying a function to the unique identifier. The function is, for example, a hash function or a similar set of functions that accept a string of characters (e.g., "netmusic") as an input and provide an encoded string (e.g., 256 bit string) as output. Furthermore, an output of the function generally includes a greater number of characters than the unique identifier. In one embodiment, the function is Advanced Encryption Standard-Synthetic Initialization Vector (AES-SIV) or SHA-256, which may provide a 256 bit output as the encoded unique identifier.

Additionally, the function may use a cryptographic key (e.g., a group key) along with the unique identifier to generate the encoded unique identifier. In one embodiment, the function includes two separate functions. For example, encoding the unique identifier may include concatenating the unique identifier with the key, hashing the concatenated unique identifier and then re-hashing/encrypting the concatenated unique identifier using the key as a seed value or initialization vector. While hashing the unique identifier is discussed, of course, encoding the unique identifier may take many different forms.

As a second part of generating the obscured identifier at 330, the encoded unique identifier is truncated to further obscure the encoded unique identifier. Thus the obscured identifier is a shorter string (e.g., is formed from fewer characters) than the encoded unique identifier. If the encoded unique identifier is 256 bits, in this example, there are many different octets to select from the string when truncating. Accordingly, in one embodiment, truncating occurs according to a predefined rule. That is, a certain octet is pre-designated to be used or an octet is selected according to a known function. For example, the encoded identifier may be: truncated to include only a first octet, truncated to include a different subsequent octet for each subsequent communication, truncated according to an octet that aligns with an additional identifier in the discovery communication, or, more generally, truncated according to some known pattern. In this way, an obscured identifier for a service can be varied while still ensuring a device that receives the obscured identifier can recognize a service associated with the obscured identifier. Of course, while truncating the encoded unique identifier according to octets is discussed, in one embodiment, the encoded unique identifier is truncated to include a predetermined number of bits or according to another function that shortens a length of the encoded unique identifier.

Furthermore, in another embodiment, in addition to generating the obscured identifier, at 330, other portions of the discovery communication that include sensitive information are encoded in a similar manner. In this way, contents of the discovery communication are secured against eavesdropping and other malicious attacks.

With continued reference to FIG. 3, after the obscured identifier has been generated and added to the discovery communication, the discovery communication is wirelessly transmitted, at 340. In general, the type of the discovery communication dictates how the discovery communication is transmitted. That is, if the discovery communication is an announcement or query, then transmission includes broadcast or multicast. However, if the discovery communication is a subscribe request, then transmitting may include unicasting to a single recipient.

After the discovery communication is received by nearby devices, one or more of the devices may generate and transmit a reply message. If the devices are operating with a similar encoding logic, then the service identifiers are obscured in the reply message. Continuing with method 300, at 350, the reply is received in response to the discovery communication. As briefly discussed in relation to encoding at 330, a reply may include an asymmetric identifier of the service. That is, in one embodiment, instead of the reply including the same obscured identifier, the reply includes a different portion (i.e., different octet) of the encoded unique identifier. Accordingly, two successive communications do not include identical identifiers of the service when using asymmetric identifiers. Thus, a subject service of the communications is further obscured from being identified by malicious attack.

Additionally, in one embodiment, upon receiving the reply or another communication that includes an obscured identifier, the obscured identifier is decoded from the reply communication by the device that receives the reply. Thus, at 350, the device determines which service is associated with the communication by decoding the obscured identifier using the encoding function and the key. In this way, an identity of the service that is a subject of the communications can only be recognized by devices that have the encoding logic and/or are authorized as part of a network group. Accordingly, the service identifiers can be obscured from unauthorized devices even though the service identifiers are part of discovery communications that are otherwise open communications for all devices to see (e.g., the discovery communication has a secured portion and an unsecured portion).

Figure 4:
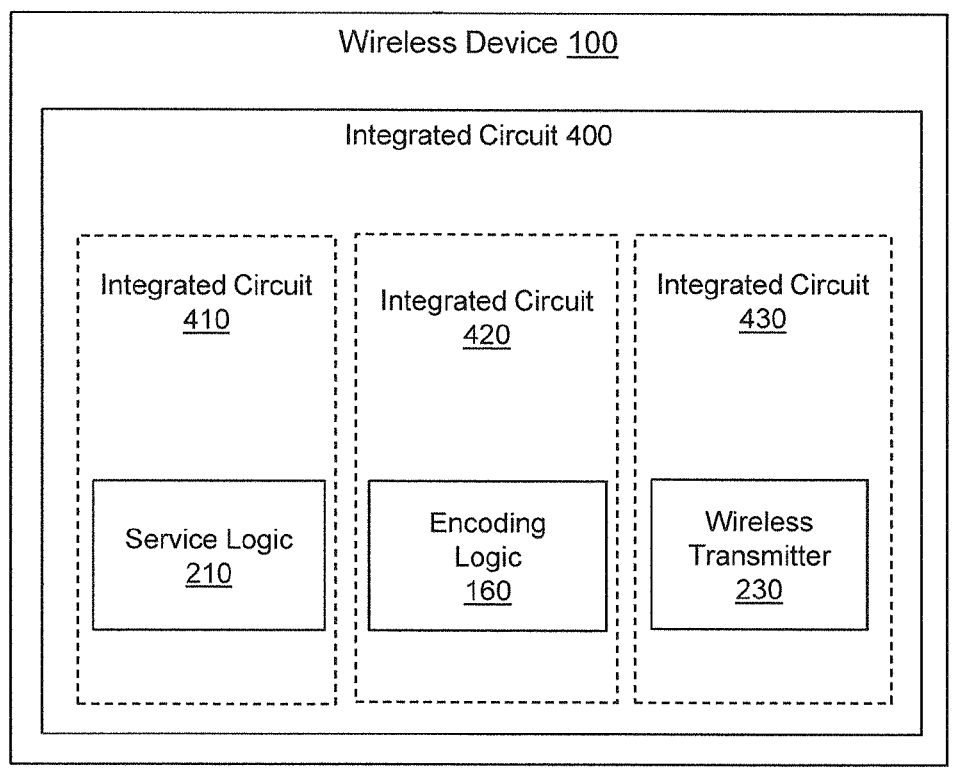
FIG. 4 illustrates one embodiment of an integrated circuit associated with securing service discovery.

FIG. 4 illustrates an additional embodiment of the wireless device 100 from FIGS. 1 and 2 that is configured with separate integrated circuits and/or chips in an integrated circuit 400. In this embodiment, the service logic 210 from FIG. 2 is embodied as a separate integrated circuit 410. Additionally, the encoding logic 160 is embodied on an individual integrated circuit 420. The wireless transmitter 230 is also embodied on an individual integrated circuit 430. The circuits are connected via connection paths to communicate signals. While integrated circuits 410, 420, and 430 are illustrated as separate integrated circuits, they may be integrated into a common integrated circuit board 400. Additionally, integrated circuits 410, 420, and 430 may be combined into fewer integrated circuits or divided into more integrated circuits than illustrated. In another embodiment, the service logic 210, the encoding logic 160, and the wireless transmitter 230 (which are illustrated in integrated circuits 410, 420, and 430, respectively) may be combined into a separate application-specific integrated circuit. In other embodiments, portions of the functionality associated with the service logic 210, the encoding logic 160, and the wireless transmitter 230 may be embodied as firmware executable by a processor and stored in a non-transitory memory.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium" as used herein is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data. Computer storage media described herein are limited to statutory subject matter under 35 U.S.C §101.

"Logic" as used herein includes a computer or electrical hardware component(s), firmware, a non-transitory computer storage medium that stores instructions for performing associated functions as described herein, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C §101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C §101.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. §101.

What is claimed is:

1. An apparatus, comprising:
    encoding logic configured to generate an obscured identifier from a unique identifier of a service by, (i) encoding the unique identifier, and (ii) truncating the encoded unique identifier to form the obscured identifier; and
    service logic configured to control a wireless transmitter to wirelessly transmit the obscured identifier in a communication to a plurality of remote devices, wherein the service is a network service provided over a wireless connection in a network, wherein the service logic is configured to determine the unique identifier for the service according to a standard for naming services in order to identify the service to the plurality of remote devices in the communication,
    wherein the network includes the plurality of remote devices, and wherein the service logic is configured to receive, in response to the communication, a reply that includes an asymmetric identifier of the service that does not match the obscured identifier, and wherein the asymmetric identifier is a different portion of the encoded unique identifier than the obscured identifier.

2. The apparatus of claim 1, wherein the encoding logic is configured to use a hash function to encode the unique identifier and to form the obscured identifier from a portion of the encoded unique identifier that is less than a whole of the encoded unique identifier to prevent unauthorized devices from recognizing the unique identifier, and wherein the asymmetric identifier is formed from a separate set of bits of the encoded unique identifier than a set of bits of the encoded unique identifier that form the obscured identifier.

3. The apparatus of claim 1, wherein the encoding logic is configured to encode the unique identifier by using a group key with a hash function, wherein the group key is shared by the plurality of remote devices, and wherein the plurality of remote devices form a neighbor awareness network (NAN).

4. The apparatus of claim 1, wherein the service logic is configured to generate the communication as a communication to discover whether at least one of the plurality of remote devices provides the service.

5. The apparatus of claim 1, wherein the encoding logic is configured to encode the unique identifier to secure communications between the apparatus and the plurality of remote devices from devices that are not members of the network, wherein the apparatus and the plurality of remote devices form an ad-hoc wireless network that is a neighbor awareness network (NAN) within a wireless transmission range of the apparatus, and wherein the service is provided by at least one of the plurality of remote devices within the NAN.

6. The apparatus of claim 1, wherein the service is a service provided over a broadcast media between at least two devices, and wherein the communication is a communication that indicates availability of the service from the apparatus.

7. A method, comprising:
    determining a unique identifier for a service according to a standard for naming services;
    generating an obscured identifier from the unique identifier assigned to a service by
        (i) encoding the unique identifier, and
        (ii) truncating the encoded unique identifier to form the obscured identifier;

wirelessly transmitting the obscured identifier in a communication to a plurality of remote devices to identify the service to the plurality of remote devices, wherein the service is a network service provided over a wireless connection in a network, and receiving, in response to the communication, a reply that includes an asymmetric identifier of the service that does not match the obscured identifier, wherein the asymmetric identifier is a different portion of the encoded unique identifier.

8. The method of claim 7, wherein encoding the unique identifier includes using a hash function to encode the unique identifier, wherein truncating the encoded unique identifier includes forming the obscured identifier from a portion of the encoded unique identifier that is less than a whole of the encoded unique identifier, wherein generating the obscured identifier prevents unauthorized devices from recognizing the unique identifier, and wherein the asymmetric identifier is formed from a separate set of bits of the encoded unique identifier than a set of bits of the encoded unique identifier that form the obscured identifier.

9. The method of claim 7, wherein encoding the unique identifier includes using a group key with a hash function to encode the unique identifier, wherein the group key is shared by the plurality of remote devices and wherein the plurality of remote devices form a neighbor awareness network (NAN).

10. The method of claim 7, wherein the communication is a communication to discover whether at least one of the plurality of remote devices provides the service.

11. The method of claim 7, wherein generating the obscured identifier secures communications between the wireless device and the plurality of remote devices from devices that are not members of the network, wherein the wireless device and the plurality of remote devices form an ad-hoc wireless network that is a neighbor awareness network (NAN) within a wireless transmission range of the wireless device, and wherein the service is provided by at least one of the plurality of remote devices within the NAN.

12. The method of claim 7, wherein the service is a service provided over a neighbor awareness network (NAN) between at least two devices, and wherein the communication is a communication that indicates availability of the service from the wireless device.

13. A device, comprising:

service logic configured to generate a discovery communication that is associated with a service provided in a neighbor awareness network (NAN), wherein the NAN includes a plurality of remote devices, wherein the service logic is configured to determine a unique identifier for the service according to a standard for naming services in order to identify the service to the plurality of remote devices in the discovery communication; and encoding logic configured to generate a secure identifier from a unique identifier of the service by, (i) encoding the unique identifier, and (ii) truncating the encoded unique identifier to form the secure identifier, wherein the secure identifier is inserted in the discovery communication, wherein the service logic is configured to receive, in response to transmitting the discovery communication, a reply communication that includes an asymmetric identifier of the service that does not match the secure identifier, and wherein the asymmetric identifier is a different portion of the encoded unique identifier than the secure identifier.

14. The device of claim 13, wherein the encoding logic is configured to hash the unique identifier using a hash function, and to form the secure identifier from a portion of the encoded unique identifier that is less than a whole of the encoded unique identifier, and wherein the asymmetric identifier is formed from a separate set of bits of the encoded unique identifier than a set of bits of the encoded unique identifier that form the obscured identifier.

15. The device of claim 13, wherein the encoding logic is configured to use a group key with a hash function to encode the unique identifier, and wherein the group key is shared by the plurality of remote devices of the NAN.

16. The device of claim 13, wherein the unique identifier is assigned to the service, and wherein the secure identifier is inserted into the discovery communication in place of the unique identifier.

17. The device of claim 13, wherein the discovery communication is a publish communication or subscribe communication, wherein the publish communication announces availability of the service from the device, and wherein the subscribe communication is a discovery request that is seeking one of the plurality of remote devices that provides the service.

* * * * *